US 6,942,071 B1
Sep. 13, 2005

(12) United States Patent
Cannata et al.

(54) SELF-ENERGIZING BRAKE SYSTEM

(75) Inventors: Antonio Cannata, London (CA); Andrew M. Spriet, London (CA)

(73) Assignee: Tonand Inc., London (CA)

( * ) Notice: Subject to any disclaimer, the term of this patent is extended or adjusted under 35 U.S.C. 154(b) by 0 days.

(21) Appl. No.: 10/842,721

(22) Filed: May 11, 2004

(51) Int. Cl.⁷ .............................................. B60T 13/16
(52) U.S. Cl. ................................. 188/151 R; 303/10
(58) Field of Search ........................... 188/151 R, 290, 188/291, 292, 293, 294, 296, 264 B, 264 R; 303/10, 2, 61

(56) References Cited

U.S. PATENT DOCUMENTS

| | | | |
|---|---|---|---|
| 1,741,875 A | 12/1929 | Paul | |
| 2,880,825 A | 4/1959 | Porter | 188/91 |
| 3,638,768 A | 2/1972 | Ostwald | 188/294 |
| 3,983,966 A * | 10/1976 | Bryant | 188/2 R |
| 4,451,094 A * | 5/1984 | Martin | 303/10 |
| 4,530,416 A | 7/1985 | Kassai | 180/307 |
| 5,178,238 A | 1/1993 | Schaeff | 188/295 |
| 5,325,944 A | 7/1994 | Livingston, Sr. | 188/294 |
| 5,465,817 A | 11/1995 | Muscatell | 188/295 |
| 6,068,351 A * | 5/2000 | Martin-Gerez | 303/10 |
| 6,328,388 B1 * | 12/2001 | Mohr et al. | 303/10 |
| 6,360,854 B1 | 3/2002 | Hwang | 188/151 R |

* cited by examiner

Primary Examiner—Robert A. Siconolfi
Assistant Examiner—Melanie Torres

(57) ABSTRACT

A brake system according to the present invention comprises an eccentric rotor and a brake effecter module. The brake effecter module has a pair of hydraulically interconnected actuators, a brake control valve and a brake exciter. Each of the pair of actuators can engage a different point on the eccentric rotor. The brake control valve effects braking by restricting the flow of a working fluid that is pumped in and out by each of the actuators as they engage the rotating rotor. The degree of restriction to the flow of the working fluid can be varied to adjust the amount of braking force applied. The brake system is self-energizing in that it is not reliant on a substantial external source of energy to effect braking. The energy required to pump the working fluid is derived from the rotation of the rotor. The brake exciter provides for disengagement of the actuators from the rotor when braking force is not being applied.

12 Claims, 4 Drawing Sheets

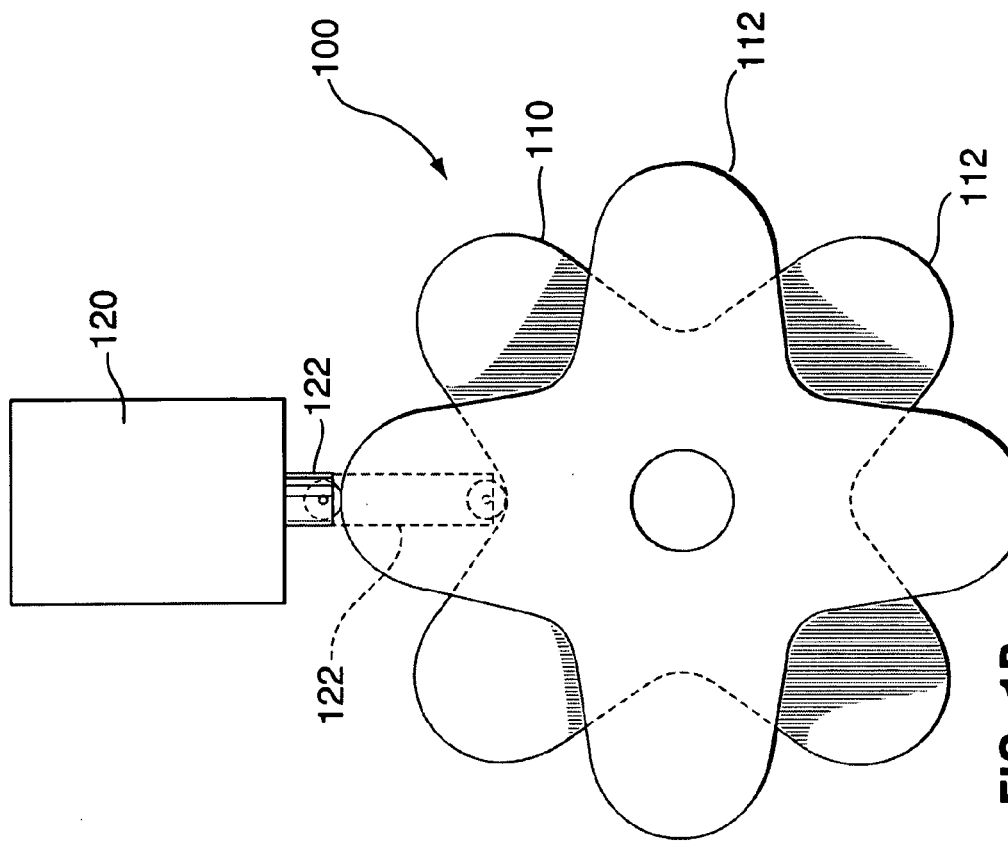
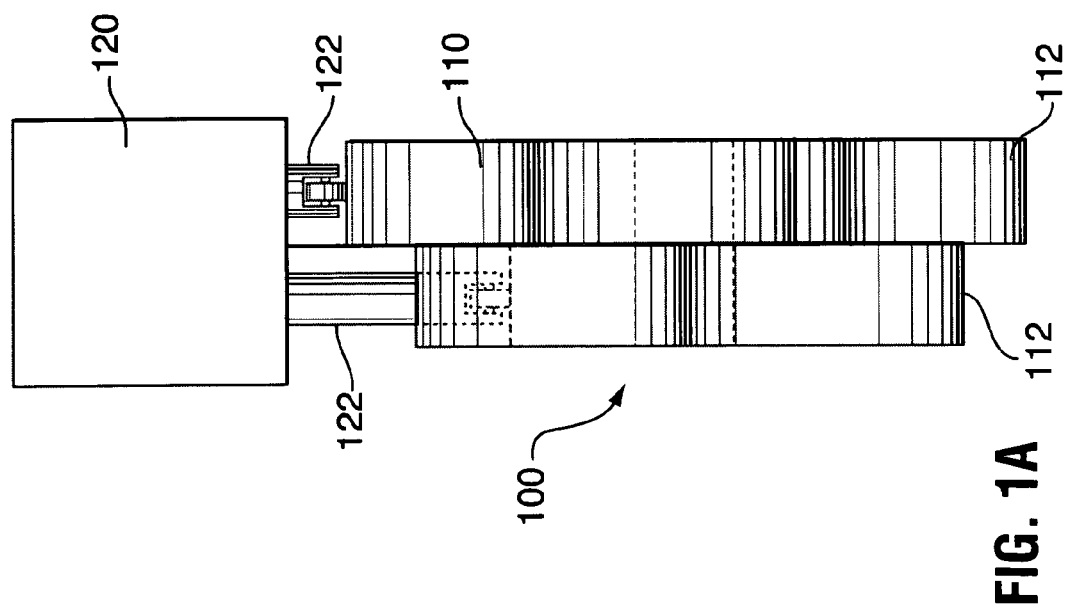
FIG. 1B
FIG. 1A

SELF-ENERGIZING BRAKE SYSTEM

FIELD OF INVENTION

The present invention relates to the field of brake systems. In particular, to self-energizing brake systems.

BACKGROUND

Brake systems such as those used to retard the motion of all manner of wheeled transportation vehicles come in many forms. The brake systems are most typically of a drum or disk configuration with a shoe or pad made of abrasive material acting on the drum or disk, respectively, to produce a friction derived braking force. Application of the shoe or pad is usually accomplished by the application of force, in the form of pressure, to press an abrasive face of the shoe or pad against the drum or disk.

In early brake systems the force pressing on the shoe or pad was applied mechanically using mechanical advantage (leverage) to augment the brake force applied by the vehicle operator at the operator interface (usually a brake pedal). Later systems used a hydraulic circuit to convert operator input to a hydraulic force acting on the braking components. Numerous approaches have been developed to augment the operator input to the brake system in order to provide additional energization (applied force) of the braking components. These approaches include vacuum assist, pump-generated hydraulic assist, electric servo assist, pump-generated air pressure assist and other similar approaches.

Despite the fact that a brake system is an essential and critical component of most transportation vehicles, the brake systems in common use are quite complex, expensive to manufacture, and require regular and costly maintenance due to their complexity and the use of consumable friction materials as the primary mechanism for generating braking forces.

What is needed is a self energizing brake system.

SUMMARY OF INVENTION

A brake system according to the present invention comprises an eccentric rotor and a brake effecter module. The brake effecter module has a pair of hydraulically interconnected actuators, a brake control valve and a brake exciter. Each of the pair of actuators can engage a different point on the eccentric rotor. The brake control valve effects braking by restricting the flow of a working fluid that is pumped out by each of the actuators as they engage the rotating rotor. The degree of restriction to the flow of the working fluid can be varied to adjust the amount of braking force applied. The brake system is self-energizing in that it is not reliant on a substantial external source of energy to effect braking. The energy required to pump the working fluid is derived from the rotation of the rotor. The brake exciter provides for disengagement of the actuators from the rotor when braking force is not being applied.

In accordance with one aspect of the present invention, a brake system for applying a braking force to a vehicle wheel responsive to a brake force control signal comprising: an eccentric rotor connected for rotation with the vehicle wheel; and a brake effecter module having: a pair of hydraulically interconnected actuators each one for engagement with said eccentric rotor; a brake control valve for progressively restricting the hydraulic interconnection between said actuators responsive to the brake force control signal; and a brake exciter for operating said pair of actuators between a first position not in engagement with said eccentric rotor and a second position in engagement with said eccentric rotor.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which:

FIGS. 1A and B are a front and side view, respectively, of a schematic representation of a brake system according to an embodiment of the present invention.

DETAILED DESCRIPTION

Figure 2:
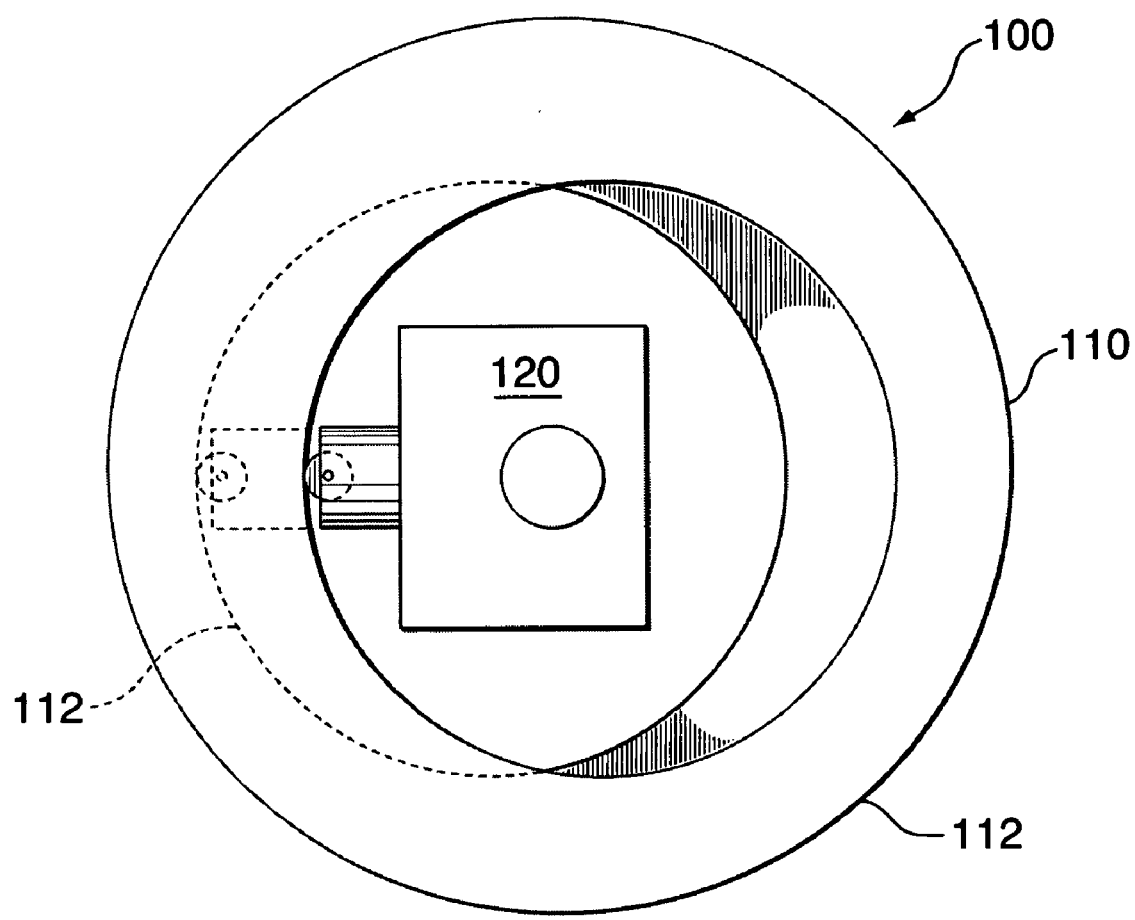
FIG. 2 is a side view of a schematic representation of another exemplary embodiment of a brake system according to the present invention.

FIGS. 1A and B are a front and side view, respectively, of schematic representations of a brake system 100 according to an embodiment of the present invention for use in, for example, a wheeled vehicle. The brake system 100 is comprised of a rotor 110 and a brake effecter module 120. The rotor 110 can be connected to a vehicle wheel (not shown) so as to rotate when the wheel rotates. The rotor has two eccentric (cammed) surfaces 112. The brake effecter module 120 has a pair of hydraulically interconnected actuators 122, a brake control valve 124 and a brake exciter 126. Each of the pair of actuators 122 can engage a different one of the two eccentric surfaces 112 of the rotor. The brake control valve 124 effects braking by restricting the flow of a working fluid that is pumped out by each of the actuators 122 as it engages the rotating rotor. The degree of restriction to the flow of the working fluid can be varied to adjust the amount of braking force applied. The working fluid can be, for example, brake fluid, automatic transmission fluid (ATF) or other similar non-compressible fluids. The brake system 100 can be considered self-energizing in that it is not reliant on a substantial external source of energy to effect braking. The energy required to pump the working fluid is derived from the rotation of the rotor 110. The brake exciter 126 provides for disengagement of the actuators 122 from the rotor when braking force is not being applied.

In an exemplary embodiment of the present invention, the rotor 110 is substantially disc-shaped with two eccentric surfaces 112 disposed for peripheral engagement by the actuators 122 (see FIG. 1B). The two eccentric surfaces 112 have corresponding cam profiles in terms of a number of undulations on each surface and the amplitude of the undulations. The two eccentric surfaces 112 can be arranged such that there is a radial angle displacement between corresponding points on the eccentric surfaces 112 (i.e. that one eccentric surface 112 is rotated relative to the other). When installed on a vehicle, the rotor 110 is so arranged that it is rotatably connected to a wheel (not illustrated) of the vehicle. Rotation of the wheel causes the rotor 110 to rotate and braking force applied to the rotor 110 causes braking (deceleration) of the wheel. The brake system 100 can also be used to prevent acceleration of the wheel such as, for example, to hold the vehicle stationary.

The rotor 110 of FIGS. 1A and B has four lobes on each of the two eccentric surfaces 112. In an alternative embodiment of the present invention, each eccentric surface 112 can have one, two, three or more lobes while remaining within the scope and spirit of the present invention. In a further alternative embodiment, the rotor 110 can be formed from two disc elements (in immediate contact or spaced apart) each having an eccentric surface 112. FIG. 2 is a side view of a schematic representation of another exemplary embodiment of a brake system according to the present invention in which the two eccentric surfaces 112 can be arranged on the interior periphery of the rotor 110 for engagement by a brake effecter module 120 having actuators 122 extending radially outward relative to the axis of rotation of the rotor 110. In yet another alternative embodiment the two eccentric surfaces 112 can be arranged on the sides of the rotor 110 for engagement by the brake effecter module 120 having actuators 122 extending laterally toward the sides of the rotor 110.

Figures 3A, 3B:
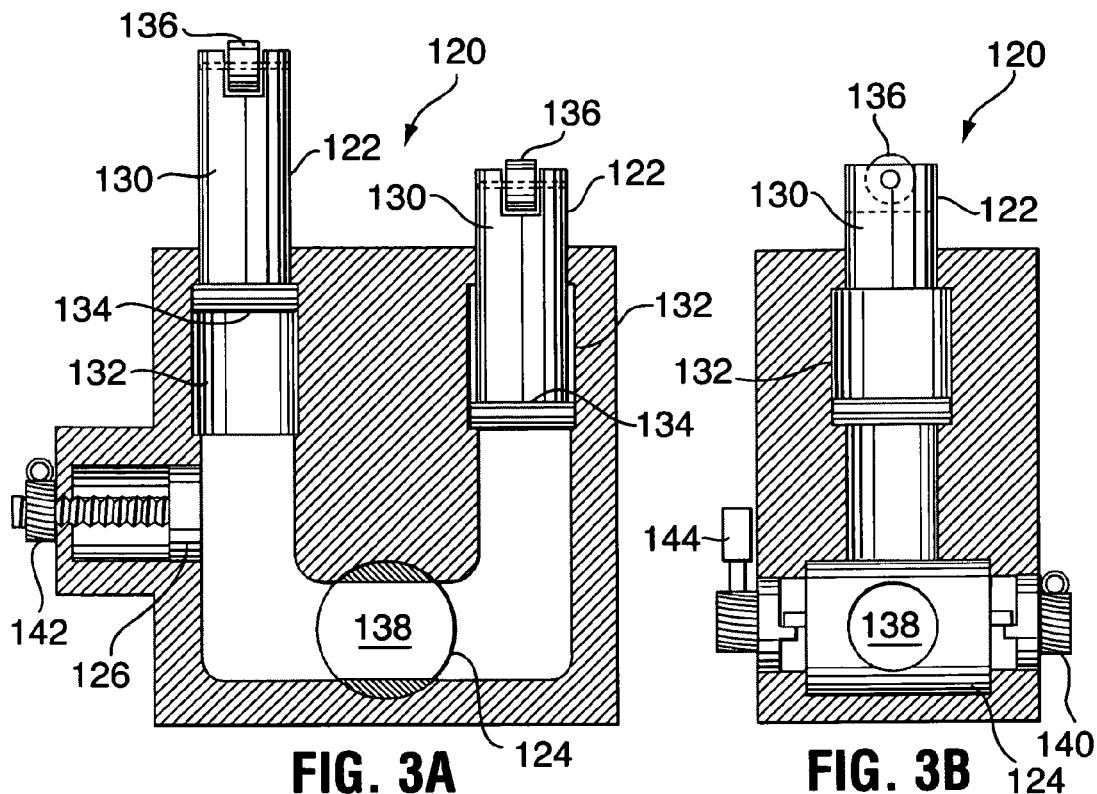
FIGS. 3A and B are a front and side partial cross-sectional views, respectively, of a brake effecter module according to an exemplary embodiment of the present invention.

FIGS. 3A and B are a front and side partial cross-sectional views, respectively, of the brake effecter module 120 according to an exemplary embodiment of the present invention. The pair of actuators 122 engages the rotor 110 (not shown in FIGS. 3A and B, see FIGS. 1A and B) in order to generate braking forces. Each actuator 122 is comprised of a cam follower 130 and a hydraulic cylinder 132. The hydraulic cylinder 132 contains a piston 134 which can reciprocate in the hydraulic cylinder 132. The cam follower 130 is connected to the piston 134 and moves in and out of the hydraulic cylinder 132, through an aperture, in conjunction with movement of the piston 134. A low-friction interface 136 is disposed at one end of the cam follower 130. The low-friction interface 136 can engage (i.e. come in contact with) one of the eccentric surfaces 112 of the rotor. The low-friction interface 136 preferably generates little frictional resistance to rotational motion of the rotor relative to the actuator 122. The low-friction interface 136 can, for example, be comprised of a ball bearing, a roller bearing or other similar low-friction bearing mechanisms including sliding mechanisms.

When the brake system 100 is applying braking force, the actuator 122 is engaged with the rotor 110. Each cam follower 130 moves back and forth (i.e. reciprocates) in response to the undulations on the eccentric surface 112 of the rotating rotor 110. The back and forth movement of the cam follower 130 results in similar movement of the piston 134 and therefore expansion and contraction of the volume of working fluid in the hydraulic cylinder 132.

The actuators 122 are arranged to engage different points along the respective cam profiles (i.e. undulations) of the eccentric surfaces 112 such that one actuator 122 is engaged with a rising portion of one eccentric surface 112 while the other actuator 122 is engaged with a falling portion of the other eccentric surface 112 at a given position of the rotor 110. At any point in the rotation of the rotor 110 one of the actuators 122 has its cam follower 130 extending out to the rotor 110 while the other actuator 122 has its cam follower 130 being retracted in by the rotor 110. In an alternative embodiment the rotor 110 can have a single eccentric surface 112 and the brake effecter module 120 be so arranged that each of the two actuators 122 engages the single eccentric surface 112 such that one actuator 122 is engaged with a rising portion of the eccentric surface 112 while the other actuator 122 is engaged with a falling portion of the eccentric surface 112 at a given position of the rotor 110.

As the actuators 122 extend and retract in response to the rotation of the rotor 110 each in turn alternately pumps working fluid out and pumps working fluid in. Restriction of the working fluid flow by the brake control valve 124 results in restricted displacement of working fluid from one hydraulic cylinder 132 to the other hydraulic cylinder 132. In turn the extension and the retraction of the actuators 122 is resisted by the restricted working fluid flow out of each actuator 122 thereby applying a braking force to the rotor 110.

Figure 3C:
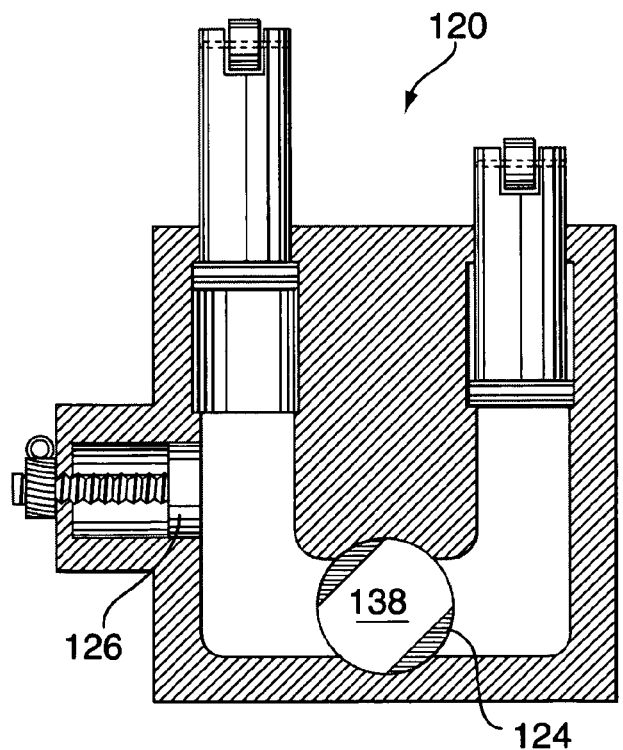
FIGS. 3C–E are front partial cross-sectional views of a brake effecter module according to an exemplary embodiment of the present invention showing the brake controller valve and the brake exciter in a variety of operating positions.

The interconnection between the two actuators 122 can have substantially the same cross-sectional area as the bores of the hydraulic cylinders 132 in the actuators 122 thereby providing for substantially unrestricted fluid communications when the brake control valve 124 is in an open position (see FIGS. 3A and B). The brake control valve 124 is operable from the open position to a closed position (see FIG. 3D) while providing progressively restricted flow at positions in between (see FIG. 3C). The brake control valve 124 can, for example, be a spool valve, a ball valve, port valve or other similar proportionate flow-restricting mechanism. The brake control valve 124 provides for substantially unrestricted fluid flow through when in the open position. The brake control valve 124 can provide one or more passages 138 through which the working fluid can flow.

The braking force applied to the rotor 110 is proportional to a brake force control signal received by the brake system 100. The brake force control signal is proportionate to a desired braking input provided by a vehicle operator at an operator interface such as, for example, a brake pedal (not shown). The brake force control signal can take the form of an electrical signal, a hydraulic pressure signal, a pneumatic signal or other similar signaling mechanisms (not shown) that provide for the propagation of a proportionate (i.e. variable) control signal. Correspondingly, the brake control valve 124 can be operated by an electric motor, an electric solenoid, a hydraulic actuator, a pneumatic actuator or other similar mechanism (not shown). In the case of a hydraulic pressure signal, the pressure required for the hydraulic pressure signal can be substantially less than the operating pressure of the working fluid in the brake system 100.

Referring again to FIG. 3B, the brake control valve 124 is operated by an electric motor (not shown) through a worm gear arrangement 140. The worm gear arrangement 140 provides for the electric motor to operate the brake control valve 124 to any position from the open position to the closed position. In addition, since the worm gear arrangement 140 is non-reversible, it prevents any other forces acting on the brake control valve 124 (such as internal forces resulting from restricted working fluid flow) from operating the brake control valve 124 to a different position.

The brake exciter 126 provides for expansion of the hydraulic volume of the interconnection between the actuators 122. The brake exciter 126 is operable between an engage position (see FIGS. 3A, C and D) and a disengage position (see FIG. 3E). In the engage position, the actuators 122 are in engagement with the rotor and therefore braking force can be applied. In the disengaged position, the actuators 122 are withdrawn out of engagement with the rotor thereby eliminating resistance on the rotor, due to pumping losses, when braking force is not being applied. Disengagement of the actuators 122 is effected by the exciter increasing the hydraulic volume of the interconnection between the actuators 122 when in the disengaged position thereby causing the actuators 122 to be drawn into their respective hydraulic cylinder 132s.

The brake exciter 126 is operated by an electric motor (not shown) through a worm gear arrangement 142. The worm gear arrangement 142 provides for the electric motor to operate the brake exciter 126 from the engage position to the disengaged position. In addition, since the worm gear arrangement 142 is non-reversible, it prevents any other forces acting on the brake exciter 126 (such as operating pressure of the working fluid) from operating the brake exciter 126 toward the disengaged position. In an alternative embodiment the brake exciter 126 can be operated by an electric stepper motor, an electric solenoid, a hydraulic actuator, a pneumatic actuator or other similar mechanisms.

Figure 3D:
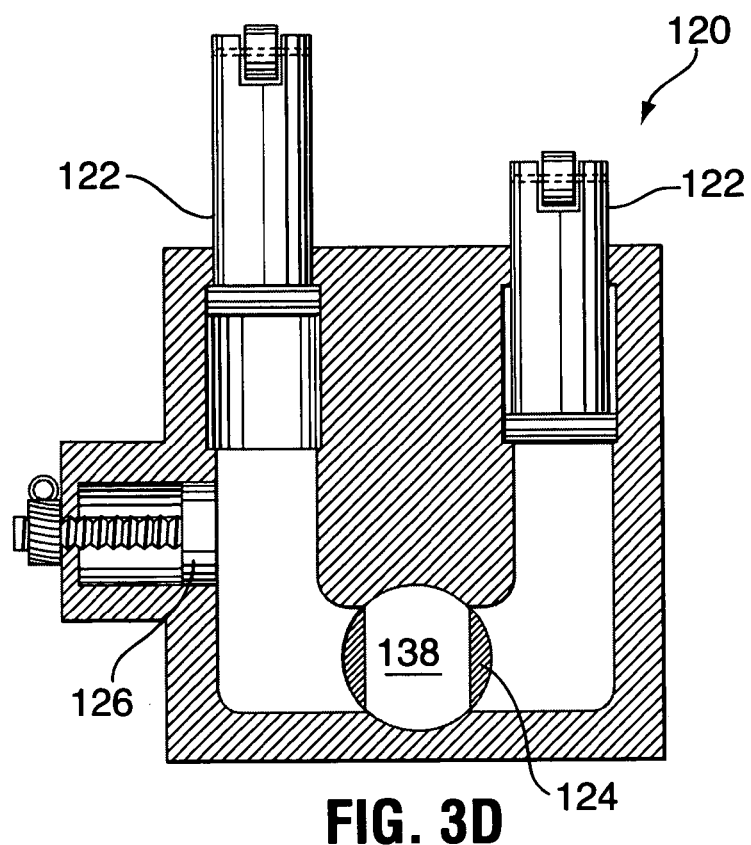
Figure 3E:
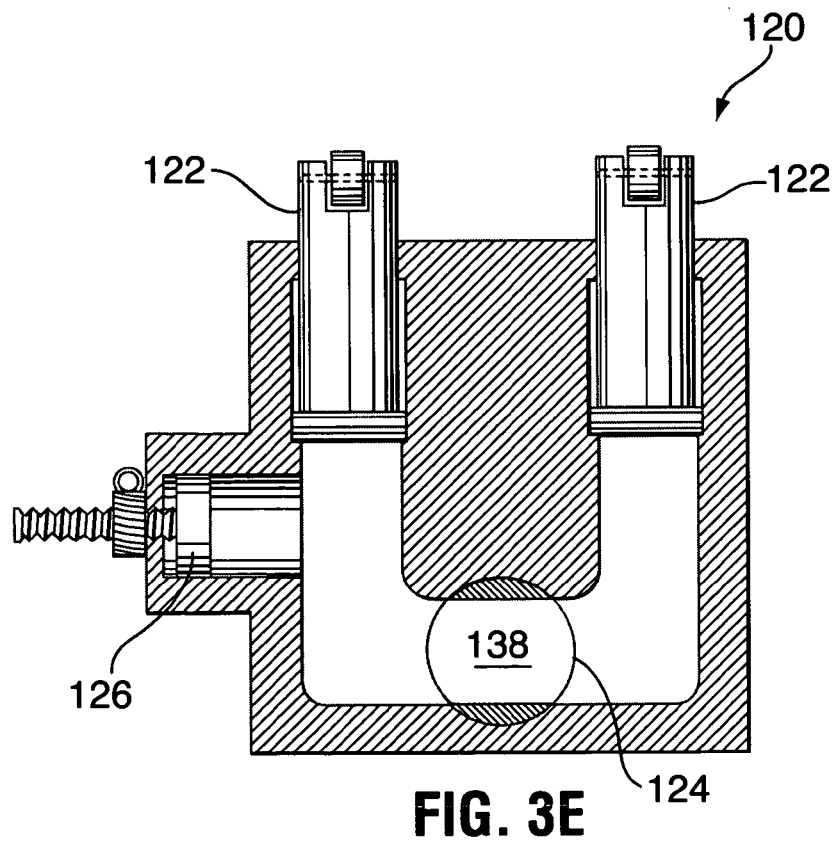

A parking brake function can be achieved by operating the brake exciter 126 into the engaged position and the brake control valve 124 into the closed position (see FIG. 3D). In an exemplary embodiment of the present invention, each of the brake exciter 126 and the brake control valve 124 is provided with a mechanism 144 that biases them into the engaged position and the closed position respectively. The biasing mechanism 144 can include the use of a spring, a dashpot containing thermally expanding fluid or other similar mechanism. The parking brake function is disengaged when, for example, the vehicle is operating or a parking brake disengagement control is operated by overcoming the spring bias, heating of the thermally expanding fluid or other approaches appropriate to the type of biasing mechanism 144. The parking brake function is engaged by default and must be purposely disengaged. In an alternative embodiment, the parking brake function can be disengaged by default and purposely engaged using the actuation mechanisms used for the service brake function to close the control valve and move the brake exciter 126 into the engaged position. The actuator mechanisms can be worm gear arrangements or other similar non-reversible mechanisms.

A brake system 100 according to the present invention can be used as a service brake, a parking brake or a combination thereof while remaining within the spirit and scope of the present invention.

A brake system 100 according to the present invention is compatible with anti-lock brake systems (ABS). An ABS intervention can be applied by modulating the brake force control signal.

In an alternative embodiment of the brake system 100 according to the present invention, a plurality of brake effecter modules 120 can engage a rotor 110.

A brake system 100 according to the present invention can be used on each wheel or axle of a vehicle. Preferably, the brake system 100 of each wheel or axle can operate independently of any brake system 100 at another wheel or axle thereby providing for robustness against individual brake system 100 failure.

It will be apparent to one skilled in the art that numerous modifications and departures from the specific embodiments described herein may be made without departing from the spirit and scope of the present invention.

What is claimed is:

1. A brake system for applying a braking force to a vehicle wheel responsive to a brake force control signal comprising:
   an eccentric rotor connected for rotation with the vehicle wheel; and
   a brake effecter module having:
      a pair of hydraulically interconnected actuators each one for engagement with said eccentric rotor;
      a brake control valve for progressively restricting the hydraulic interconnection between said actuators responsive to the brake force control signal; and
      a brake exciter for operating said pair of actuators between a first position not in engagement with said eccentric rotor and a second position in engagement with said eccentric rotor.

2. The brake system of claim 1, wherein said pair of actuators is arranged such that, alternately, one retracts while the other extends in response to rotation of said eccentric rotor.

3. The brake system of claim 1, wherein said engagement of actuators with said eccentric rotor is selected from a group of arrangements comprising peripheral, radial, lateral and combinations thereof.

4. The brake system of claim 1, wherein the eccentric rotor comprising one or more lobes.

5. The brake system of claim 1, wherein the pair of hydraulically interconnected actuators further comprising a non-compressible working fluid.

6. The brake system of claim 1, wherein each of said actuators further comprising:
   a hydraulic cylinder;
   a piston for reciprocation within said hydraulic cylinder;
   a cam follower, connect to said piston, for extending and retract through an aperture in said hydraulic cylinder; and
   a low-friction interface disposed at on end of said cam follower for engagement with said eccentric rotor.

7. The brake system of claim 6, wherein the cross-sectional area of said hydraulic interconnection is substantially the same as the cross-sectional area of said hydraulic cylinder.

8. The brake system of claim 1, wherein said brake exciter operates said pair of actuators into said first position not in engagement with said eccentric rotor by expanding the hydraulic volume of said hydraulic interconnection.

9. The brake system of claim 1, wherein a parking brake function can be effected with the brake exciter operating said pair of actuators into said second position and said brake control valve in a closed position.

10. The brake system of claim 1, the eccentric rotor having a pair of eccentric surfaces and wherein each of said pair of hydraulically interconnected actuators being for engagement with one of said pair of eccentric surfaces.

11. The brake system of claim 10, wherein each of said eccentric surfaces comprising one or more lobes.

12. The brake system of claim 11, wherein each of said eccentric surfaces comprising the same number of lobes.

* * * * *